(12) United States Patent
Mosher (10) Patent No.: US 6,655,073 B2
(45) Date of Patent: Dec. 2, 2003

(54) ADJUSTABLE BOBBER SYSTEM

(76) Inventor: Bruce Mosher, P.O. Box 104, Beltrami, MN (US) 56517

( * ) Notice: Subject to any disclaimer, the term of this patent is extended or adjusted under 35 U.S.C. 154(b) by 0 days.

(21) Appl. No.: 10/132,830

(22) Filed: Apr. 24, 2002

(65) Prior Publication Data

US 2002/0189151 A1 Dec. 19, 2002

Related U.S. Application Data

(63) Continuation-in-part of application No. 09/606,710, filed on Jun. 29, 2000, now Pat. No. 6,484,435.

(51) Int. Cl.[7] ................................................. A01K 91/00
(52) U.S. Cl. .......................................................... 43/43.1
(58) Field of Search ............................... 43/44.9, 44.95, 43/44.87, 43.14, 49.92, 44.93

(56) References Cited

U.S. PATENT DOCUMENTS

| | | | | |
|---|---|---|---|---|
| 2,239,813 A | * | 4/1941 | Dubell | 43/44.9 |
| 2,631,399 A | * | 3/1953 | Sowa | 43/44.9 |
| 3,030,726 A | * | 4/1962 | Knapton | 43/43.15 |
| 3,303,598 A | * | 2/1967 | Spindler | 43/44.9 |
| 3,461,596 A | * | 8/1969 | Green | 43/43.15 |
| 3,670,447 A | * | 6/1972 | Wohead | 43/43.14 |
| 5,970,649 A | * | 10/1999 | Alain | 43/43.14 |
| 6,079,147 A | | 6/2000 | Mosher | 43/44.95 |
| 6,145,240 A | * | 11/2000 | Adams | 43/43.1 |

* cited by examiner

Primary Examiner—Kurt Rowan (57) ABSTRACT

An adjustable bobber system for allowing adjustment of the buoyancy and for attaching to a fishing line without the use of a bead. The inventive device includes a hook member connected to a buoyant member and a first weight member slidably positioned about the buoyant member. The hook member includes a body with an open end that receives a second weight member and the buoyant member, a jaw extending from the body with a slot within, and a slit extending into the jaw to the slot for receiving the fishing line below a stop knot. The buoyant member is preferably constructed of an elongated buoyant material, such as plastic foam, that is easily severed in any position by a cutting device.

10 Claims, 11 Drawing Sheets

ADJUSTABLE BOBBER SYSTEM

CROSS REFERENCE TO RELATED APPLICATIONS

I hereby claim benefit under Title 35, United States Code, Section 120 of U.S. patent application Ser. No. 09/606,710 filed Jun. 29, 2000. This application is a continuation-in-part of the Ser. No. 09/606,710 application now U.S. Pat. No. 6,484,435. The Ser. No. 09/606,710 application is hereby incorporated by reference into this application.

STATEMENT REGARDING FEDERALLY SPONSORED RESEARCH DEVELOPMENT

Not applicable to this application.

BACKGROUND OF THE INVENTION

1. Field of the Invention

The present invention relates generally to bobber devices and more specifically it relates to an adjustable bobber system that may be effectively utilized for both summer and winter fishing activities.

Ice fishing is an extremely popular sport in colder climates. When fishing with a bobber in an ice hole, it is desirable to utilize a bobber that is slidably positioned about the fishing line to allow reeling of the fishing lure along with a fish through the ice hole. Because the ice fisherman is utilizing a bobber, it is desirable to have a bobber that has little buoyancy remaining after the bait and hook are applied so as to allow a fish to engage the bait and "drag" it for a distance without having to apply much force. However, conventional bobber devices require the use of "beads" and "split shots" which are difficult to remove from the fishing line. Also, conventional bobbers have a bulbous shape making it difficult to achieve the desired buoyancy with the bait and hook applied. Hence, there is a need for a bobber system that has an adjustable buoyancy and that does not require the use of beads.

2. Description of the Related Art

Bobber devices have been in use for years. Conventional slip bobbers require severing of the fishing line and insertion of the freshly cut line through an aperture through the center of the conventional slip bobber. The ice fisherman must then secure a "stop knot" or "tie knot" to the fishing line at the desired position to prevent the bobber from slipping further up the fishing line. The fresh cut end of the fishing line is then attached to a leader or fishing lure. In addition, the fisherman must secure a bead between the stop knot and the bobber. The bead is larger in diameter than the interior diameter of the aperture through the bobber. This is a very cumbersome process for an ice fisherman, especially during extreme weather conditions.

Another practice among ice fisherman is to apply "split shots" to the fishing line, which are basically lead weights near the fishing lure. Because conventional bobbers have a bulbous shape to them, they have a broad central area that has a high buoyancy per height unit. To counterbalance a bobber wherein the water level is centrally position, it is desirable to add split shots so that only the upper narrower portion is exposed thereby making it easier for a fish to take under the water. This increases the ice fisherman's chances of catching a fish that has been "nibbling" upon the fishing lure or bait. An obvious disadvantage to this is that it can be difficult to see the bobber within an ice hole, especially if the water level is significantly below the surface of the ice. Another disadvantage is that the split shots can be difficult to remove from the fishing line thereby forcing the fisherman to sometimes sever a portion of the fishing line if weighted to heavily. Another disadvantage is that if too many split shots are attached to the line to reach the desired buoyancy of the slip bobber, the bait is then restricted in movement because of the extra weight. Hence, there is a need for a bobber system that overcomes these shortcomings of the prior art bobber devices.

U.S. Pat. No. 6,079,147 to Mosher illustrates an adjustable bobber system similar to the present invention. However, Mosher does not teach the usage of an adjustable balancing member to adjust for the weight of a fishing lure/jig. In addition, Mosher does not teach the usage of a weight within the head portion of the bobber to assisting in summertime casting and entry of the water. Finally, Mosher does not illustrate the usage of a closed hook member that may be severed open.

While these devices may be suitable for the particular purpose to which they address, they are not as suitable for being effectively utilized for both summer and winter fishing activities. Conventional slip bobber devices require the use of beads. In addition, conventional bobber devices are incapable of being easily adjusted for their buoyancy.

In these respects, the adjustable bobber system according to the present invention substantially departs from the conventional concepts and designs of the prior art, and in so doing provides an apparatus primarily developed for the purpose of being effectively utilized for both summer and winter fishing activities.

SUMMARY OF THE INVENTION

In view of the foregoing disadvantages inherent in the known types of bobber devices now present in the prior art, the present invention provides a new adjustable bobber system construction wherein the same can be utilized for being effectively utilized for both summer and winter fishing activities.

The general purpose of the present invention, which will be described subsequently in greater detail, is to provide a new adjustable bobber system that has many of the advantages of the bobber devices mentioned heretofore and many novel features that result in a new adjustable bobber system which is not anticipated, rendered obvious, suggested, or even implied by any of the prior art bobber devices, either alone or in any combination thereof.

To attain this, the present invention generally comprises a hook member connected to a buoyant member and a first weight member slidably positioned about the buoyant member. The hook member includes a body with an open end that receives a second weight member and the buoyant member, a jaw extending from the body with a slot within, and a slit extending into the jaw to the slot for receiving the fishing line below a stop knot. The buoyant member is preferably constructed of an elongated buoyant material, such as plastic foam, that is easily severed in any position by a cutting device.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an adjustable bobber system that will overcome the shortcomings of the prior art devices.

A main object is to provide an adjustable bobber system that may be effectively utilized for both summertime and wintertime fishing activities.

A further object is to provide an adjustable bobber system that is easily cast with little air resistance.

Another object is to provide an adjustable bobber system that enters the water in a quiet manner to reducing scaring area fish.

A further object is to provide an adjustable bobber system that may be adjusted such that the bobber will lie in a horizontal manner when a fishing lure/jig has engaged the floor of the body of water and in a vertical manner when the fishing lure/jig is off the floor.

Another object is to provide an adjustable bobber system that indicates whether fishing lures of various weights are positioned off the floor of a body of water.

Another object is to provide an adjustable bobber system that has adjustable buoyancy.

An additional object is to provide an adjustable bobber system that has a narrow diameter for allowing less water displacement per unit length.

A further object is to provide an adjustable bobber system that does not require the use of beads.

Another object is to provide an adjustable bobber system that does not require the use of split shots.

Another object is to provide an adjustable bobber system that reduces freezing of the fishing line to the bobber by maintaining the physical contact of the bobber and the fishing line below the water surface.

A further object is to provide an adjustable bobber system that can be easily attached and easily removed from the fishing line without damaging the fishing line.

Another object is to provide an adjustable bobber system that reduces the chance of binding upon the fishing line when reeling in the fishing line.

Still another object is to provide an adjustable bobber system that allows a long enough portion above the water surface to be visibly noticed by the fisherman.

Another object is to provide an adjustable bobber system that allows the removal of ice buildup without damage or breakage.

Another object is to provide an adjustable bobber system that may receive a light source within for nighttime fishing.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several view, FIGS. 1 through 12 illustrate an adjustable bobber system 10, which comprises a hook member 30 connected to a buoyant member 20 and a first weight member 40 slidably positioned about the buoyant member 20. The hook member 30 includes a body 32 with an open end 31 that receives a second weight member 50 and the buoyant member 20, a jaw 34 extending from the body 32 with a slot 36 within, and a slit 38 extending into the jaw 34 to the slot 36 for receiving the fishing line 14 below a stop knot 15. The buoyant member 20 is preferably constructed of an elongated buoyant material, such as plastic foam, that is easily severed in any position by a cutting device. The user first ties the stop knot 15 along the fishing line 14 in the desired location. The user then simply engages the hook member 30 upon the fishing line 14 below the stop knot 15. If the user desires less remaining buoyancy, the user simply removes a portion of the buoyant member 20 with a conventional cutting device, such as a scissors or a knife. The first weight member 40 is preferably adjustably positioned about the buoyant member 20 for balancing the weight of the hook member 30 to provide increased sensitivity of whether the jig is above the floor of the body of water. The first weight member 40 also provides a visible mark upon the buoyant member 20 that is a finite distance above the water level when the fishing lure and/or bait are attached when ice fishing in an ice hole. If the fish engages the bait and pulls the buoyant member 20 downwardly, the first weight member 40 will become submerged informing the fisherman that a fish is present. Because the hook member 30 remains in contact with the fishing line 14 at all times beneath the water surface, there is not freezing of the fishing line 14 to the hook member 30. In addition, any ice buildup upon the buoyant member 20 can be easily removed by simply squeezing or bending the buoyant member 20 without breaking or damaging the buoyant member 20.

As shown in FIGS. 8 through 11 of the drawings, the hook member 30 is engaged to the fishing line 14 of a fishing rod below the stop knot 15. The hook member 30 and the buoyant member 20 are then lowered into the ice hole there after supporting bait or fishing jig 16 for wintertime fishing. The hook member 30 is preferably constructed of a plastic material, however any well-known material may be utilized. The buoyant member 20 is preferably constructed of a foam rubber material or other resilient buoyant material that can preferably be severed by a conventional cutting device though not required.

Figure 3:
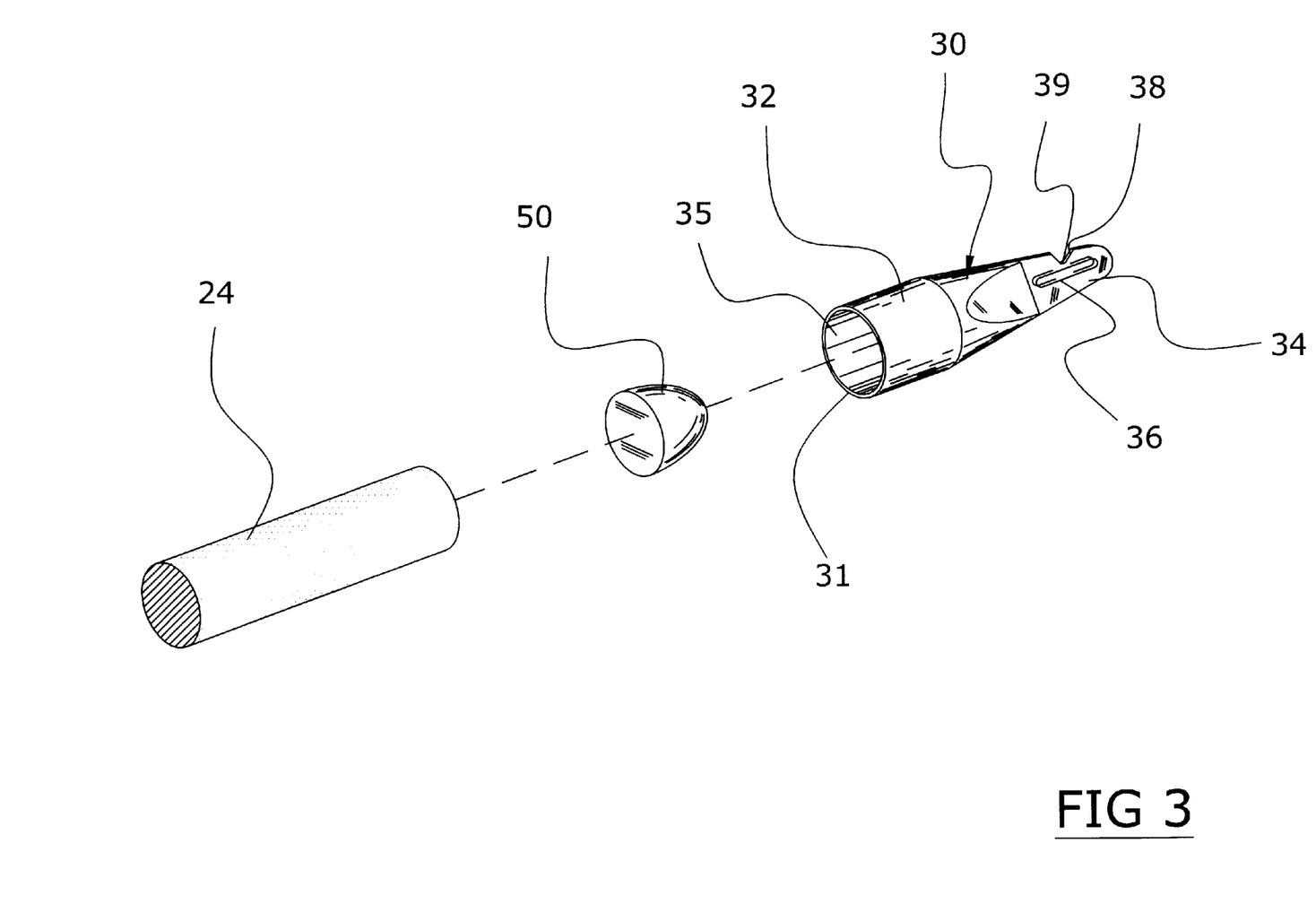
FIG. 3 is an exploded perspective view of the present invention illustrating the weight removed from the hook member.
Figure 7:
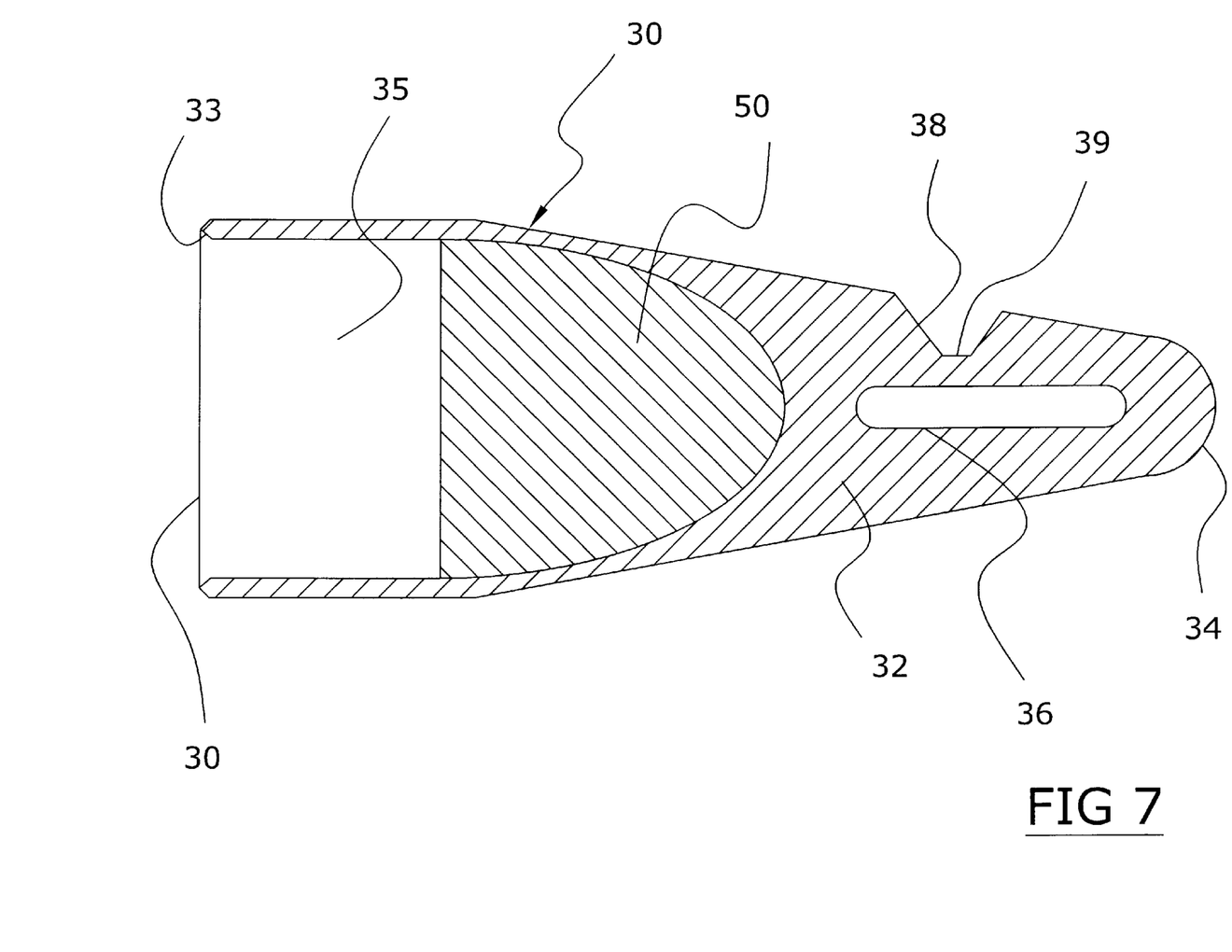
FIG. 7 is a cross sectional view taken along line 7—7 of FIG. 2 with the buoyant member removed.

As shown in FIGS. 3 and 7 of the drawings, the hook member 30 has a body 32 containing an open end 31 that exposes a cavity 35 within the hook member 30. As best shown in FIG. 7 of the drawings, the open end 31 includes a tapered edge 33 for easily receiving the buoyant member 20. The inner portion of the cavity 35 is formed to receive the second weight member 50 as shown in FIG. 7 of the drawings.

Figure 1:
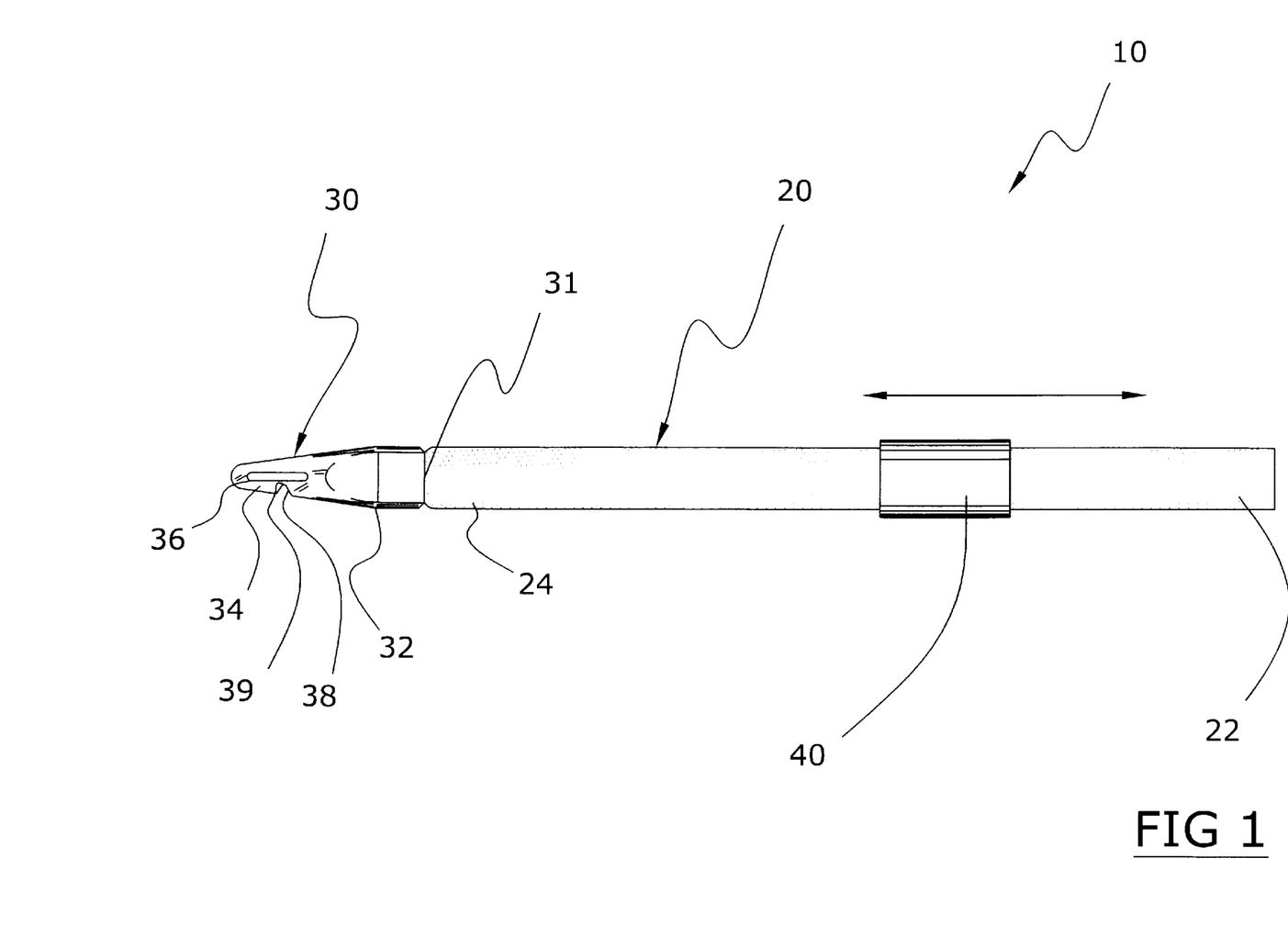
FIG. 1 is a side view of the present invention.
Figure 2:
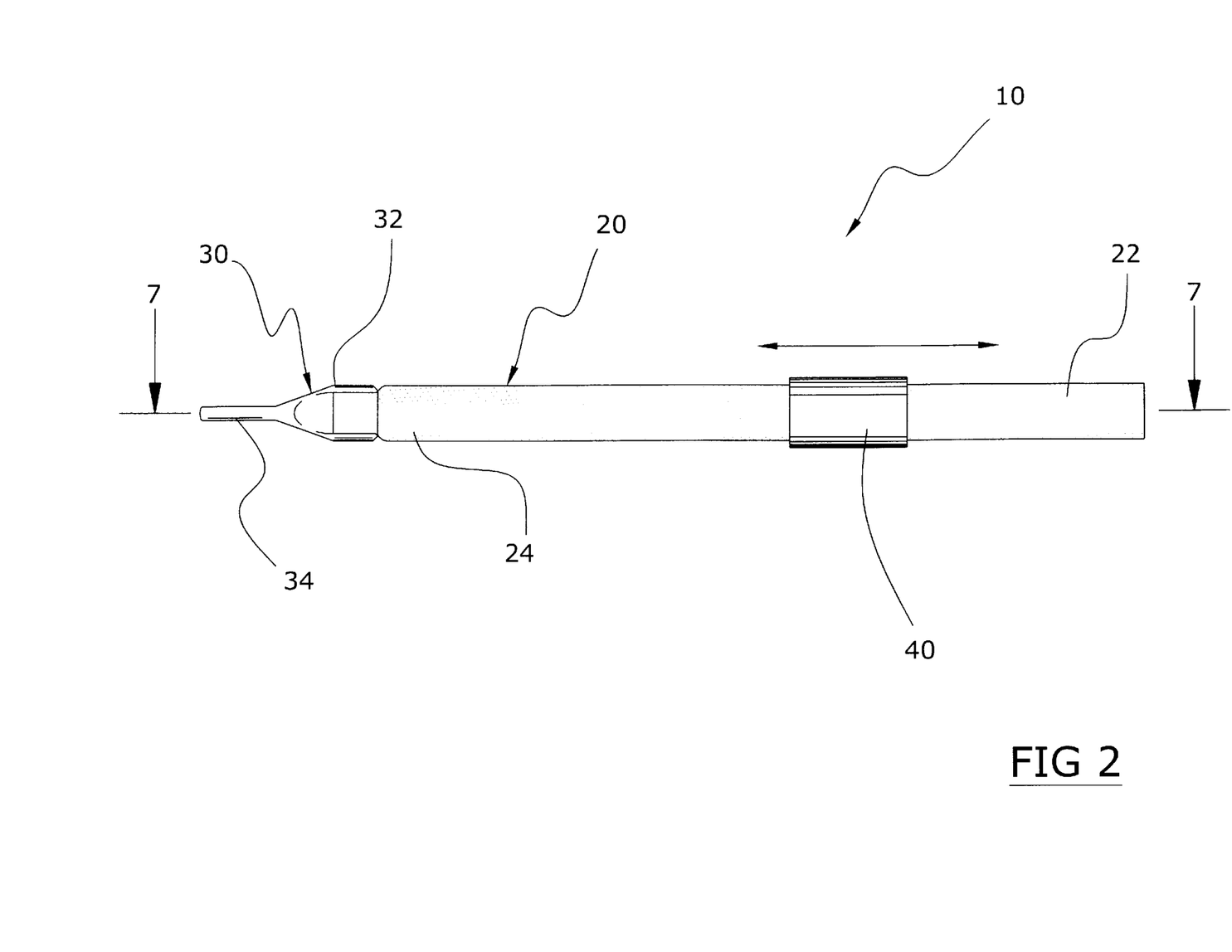
FIG. 2 is a top view of the present invention.
Figure 4:
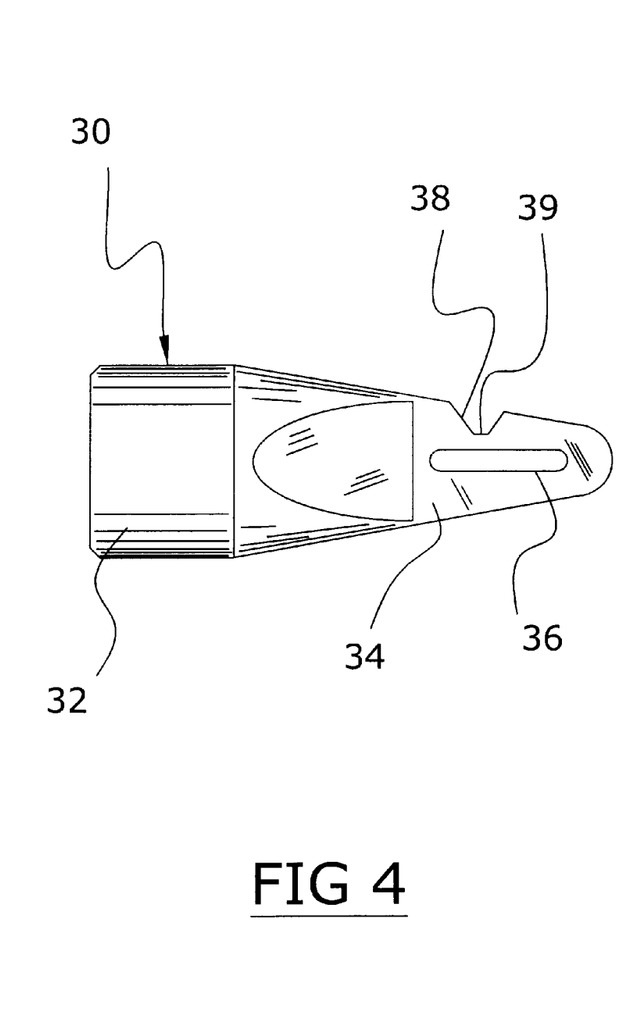
FIG. 4 is a side view of the hook member in the closed state.
Figure 5:
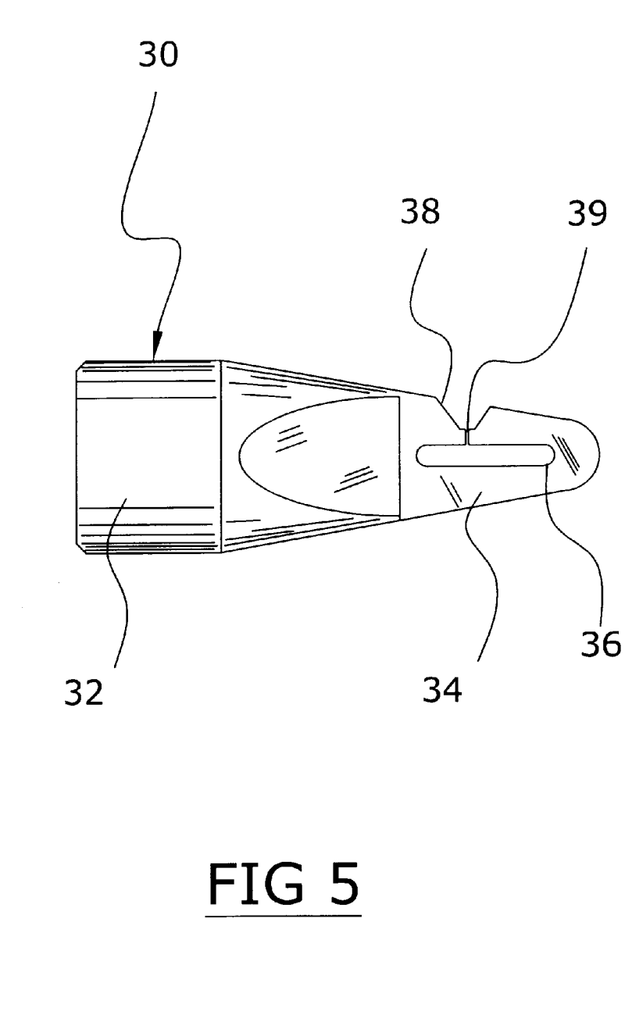
FIG. 5 is a side view of the hook member with the closed portion severed.
Figure 6:
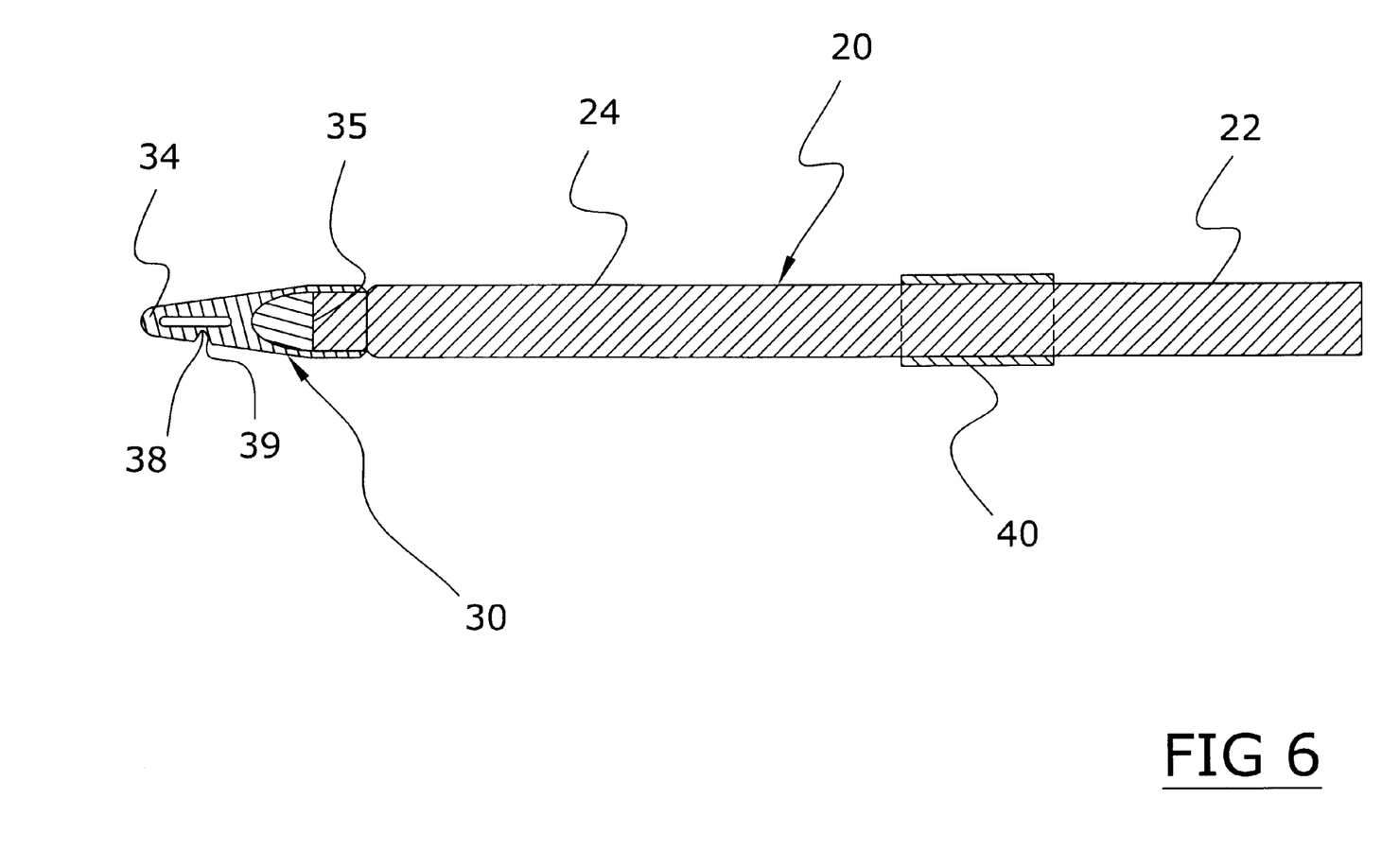

As best shown in FIGS. 1 and 5, the hook member 30 includes a jaw 34. The jaw 34 is preferably is narrower than the body 32 of the hook member 30 as shown in FIG. 2 of the drawings. As shown in FIG. 4, the jaw 34 includes a slot 36 within a central portion near the distal end thereof. The slot 36 is wider than the diameter of the fishing line 14 to allow free movement of the fishing line 14 within. As best shown in FIG. 4, a tapered slit 38 extends into a side of the jaw 34. A closed portion 39 encloses the slot 36 within the tapered slit 38 as further shown in FIG. 4 of the drawings. When the closed portion 39 is severed, the slot 36 is exposed and accessible through the tapered slit 38. The tapered slit 38 preferably has a broad portion and a narrow portion, with the narrow portion adjacent the closed portion 39. The narrow portion of the slit 38 is wide enough to snugly allow the insertion of the fishing line 14 through into the slot 36 when the closed portion 39 is severed.

As shown in FIGS. 3 and 7 of the drawings, a second weight member 50 is positioned within the cavity 35 of the hook member 30. The second weight member 50 preferably has a flat rear portion and a curved front portion as shown in FIGS. 3 and 7 of the drawings. Various other shapes may be utilized as can be appreciated. The second weight member 50 is preferably secured within the hook member 30 with an adhesive or similar substance. However, the second weight member 50 may be retained within the cavity 35 by the buoyant member 20 being secured within the cavity 35. In addition, the second weight member 50 may be molded within the hook member 30. The second weight member 50 is preferably comprised of a relatively heavy material such as lead or other metal. The second weight member 50 assists the adjustable bobber system 10 during summertime usage during casting of the invention with a fishing lure/jig 16. The second weight member 50 being heavier than the first weight member 40 and the buoyant member 20 together extends forwardly during the casting thereby significantly improving the aerodynamics of the adjustable bobber system 10 which increases the distance the user is able to cast the invention and the lure/jig 16. In addition, since the narrow jaw 34 of the hook member 30 is leading during the cast, the jaw 34 is the first portion of the invention that enters the water surface thereby resulting in a relatively quiet entry to avoid scaring the area fish.

As shown in FIGS. 1 and 2 of the drawings, the buoyant member 20 has an upper end 22 and a lower end 24. The lower end 24 is secured within the cavity 35 of the hook member 30 by conventional securing materials such as glue, adhesive or any well-known mechanical securing means. The buoyant member 20 is preferably of an elongated structure. The buoyant member 20 preferably has a cylindrical shape, however it can be appreciated that any well-known elongated shape may be utilized. The buoyant member 20 is constructed of a buoyant material that is preferably flexible and resilient. The relatively elongated narrow structure of the buoyant member 20 provides less water displacement per unit length than conventional bobber devices. The user simply removes a severed portion 26 of the buoyant member 20 to adjust the overall buoyancy of the buoyant member 20 and the hook member 30.

As shown in FIGS. 1 and 2 of the drawings, the first weight member 40 is preferably provided that adjustably surrounds the buoyant member 20 for adjusting the weight characteristics of the invention and for marking the position of the buoyant member 20 relative to the water surface 12. The first weight member 40 is preferably comprised of a resilient material such as but not limited to plastic. The first weight member 40 has a tubular structure wherein the lumen thereof is snugly positioned about the buoyant member 20 to prevent accidental movement of the first weight member 40 upon the buoyant member 20. The first weight member 40 preferably has a distinct color from the buoyant member 20 for easy visibility during all conditions. The first weight member 40 preferably has a weight less than the weight of the second weight member 50.

Figure 9:
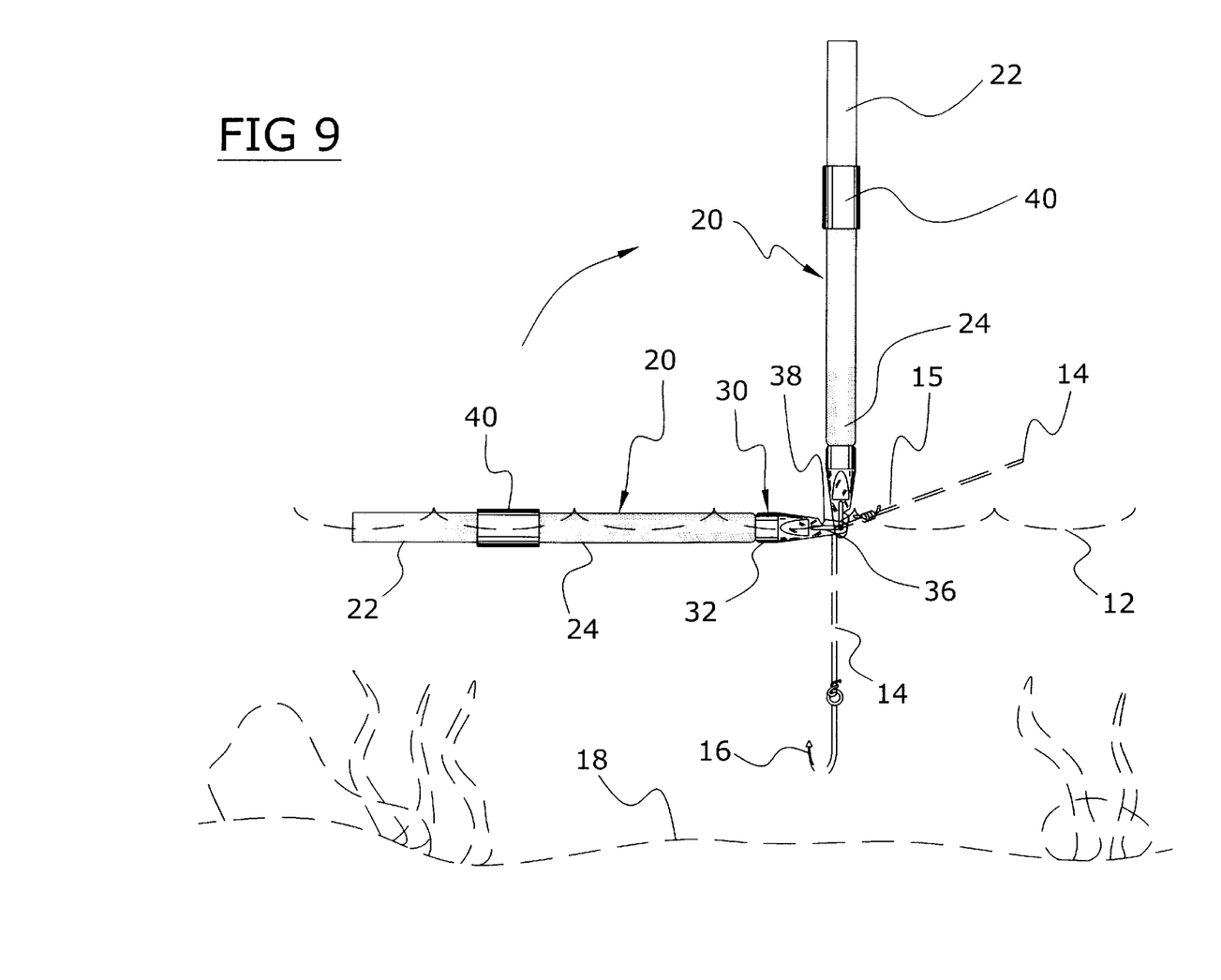
FIG. 9 is a side view of the present invention upon a surface of water with in a vertical position with the fishing lure off the floor a finite distance.
Figure 10:
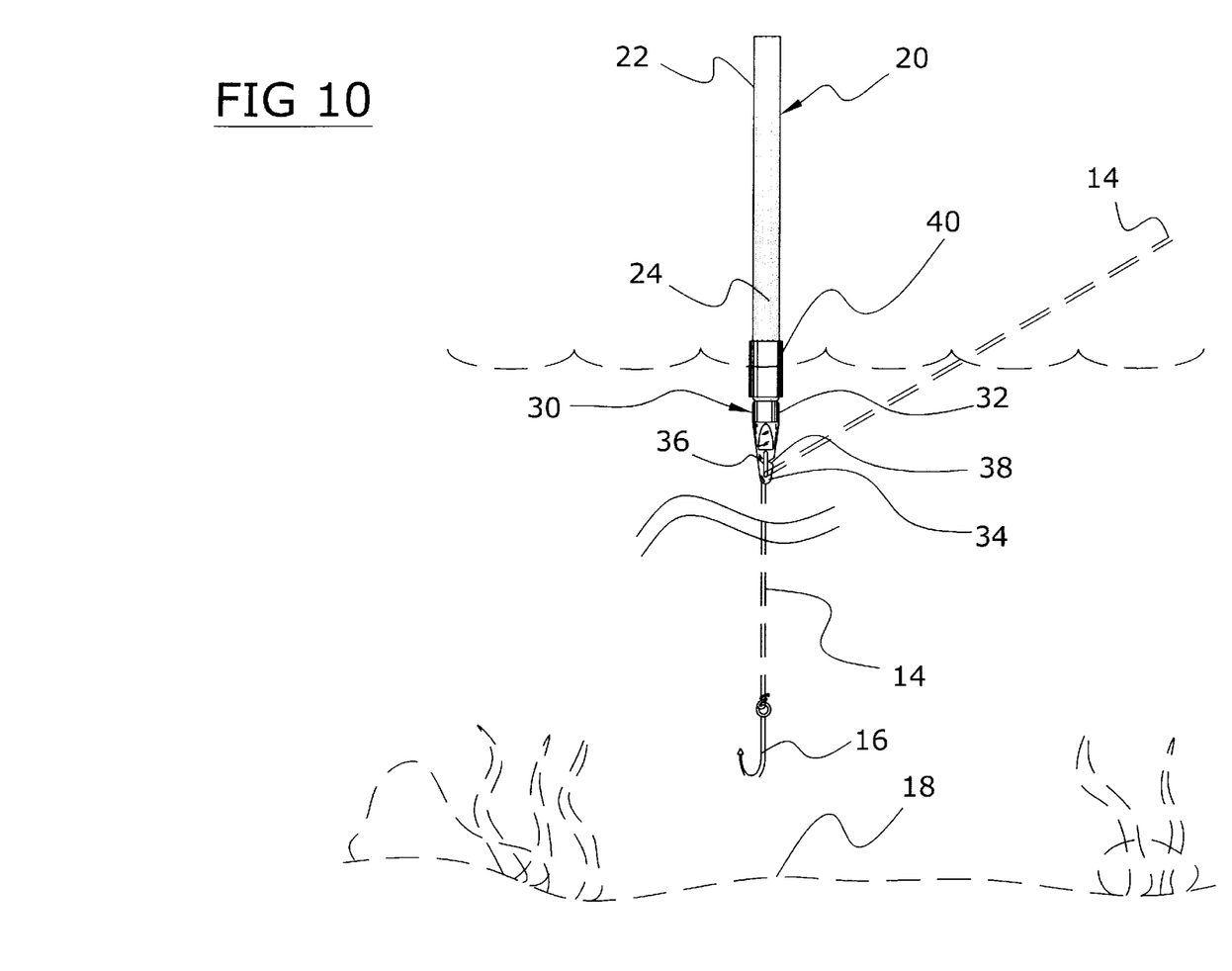
FIG. 10 is a side view with the adjustable weight positioned near the hook member.

In use, the user lowers the fishing line 14 with the bait and/or lure attached to the desired depth. After the user has determined the needed length of fishing line 14 below the water level to retain the bait at the desired depth, the user then secures a stop knot 15 upon the fishing line 14 at the desired length. The user then simply inserts the fishing line 14 into the slit 38 of the hook member 30 until the fishing line 14 is slidably positioned within the slot 36 of the jaw 34. The user then lowers or casts the fishing line 14 with the lure/jig 16 so that the buoyant member 20 is supporting the bait at the desired depth as shown in FIGS. 9 and 10 of the drawings. If there is to much buoyancy to the buoyant member 20, the user simply trims a severed portion 26 off the buoyant member 20 to achieve the desired buoyancy. The slot 36 is narrower than the stop knot 15 to prevent the stop knot 15 from extending through. Once a fish engages the bait, the buoyant member 20 is pulled under the water surface 12 until the user engages the hook or the fish is removed. If the user is able to catch the fish, the user begins to reel the fishing line 14 into the fishing rod. The buoyant member 20 lays horizontal upon the water surface 12 while the fishing line 14 is being reeled in thereby reducing the chance of the fishing line 14 binding within the slot 36 of the hook member 30. If there is ice buildup upon the buoyant member 20, the user simply squeezes or bends the buoyant member 20 thereby releasing any ice buildup without fear of damaging or breaking the buoyant member 20.

Figure 8:
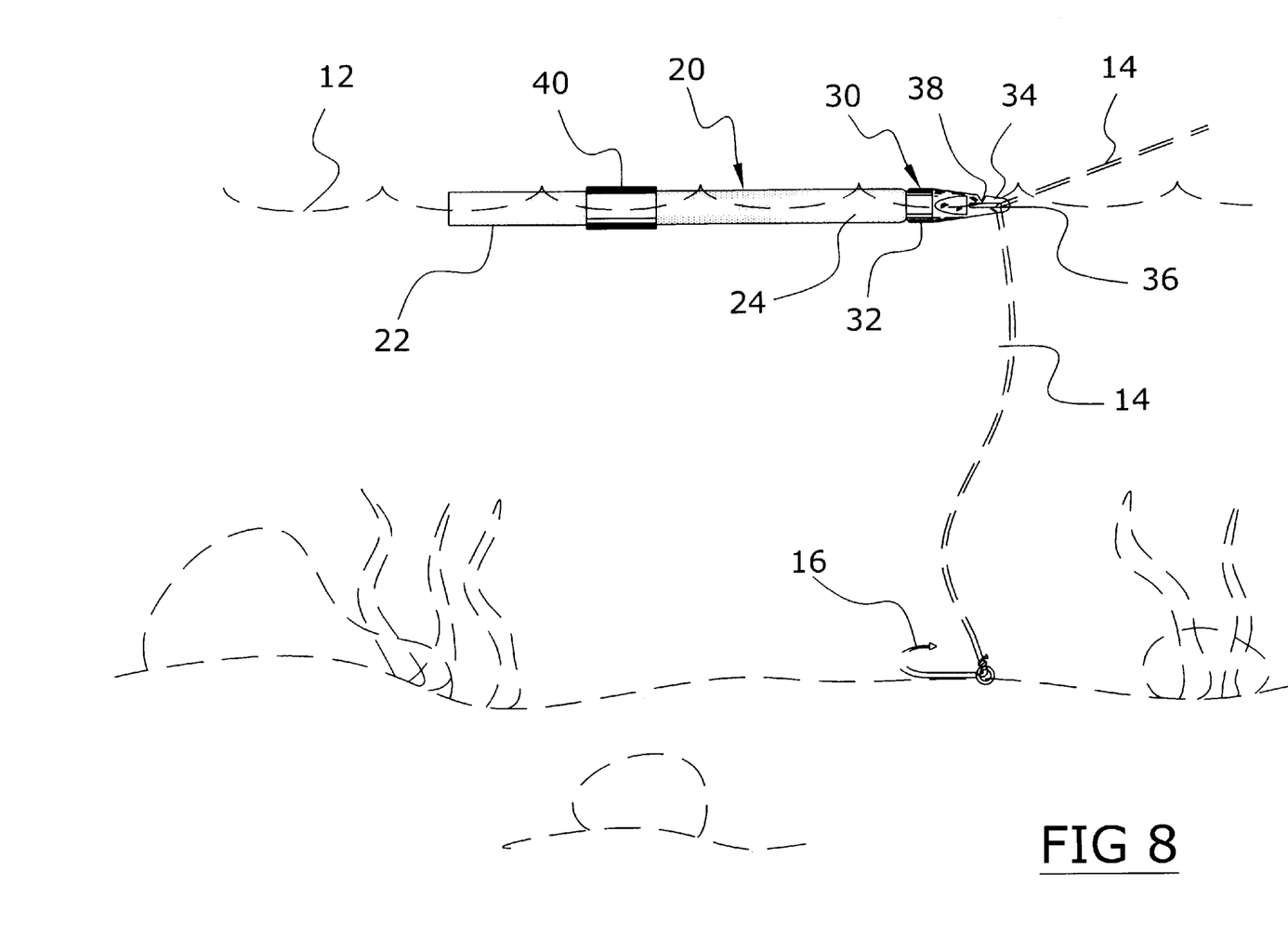
FIG. 8 is a side view of the present invention horizontally positioned upon a surface of water with fishing lure on the floor.
Figure 11:
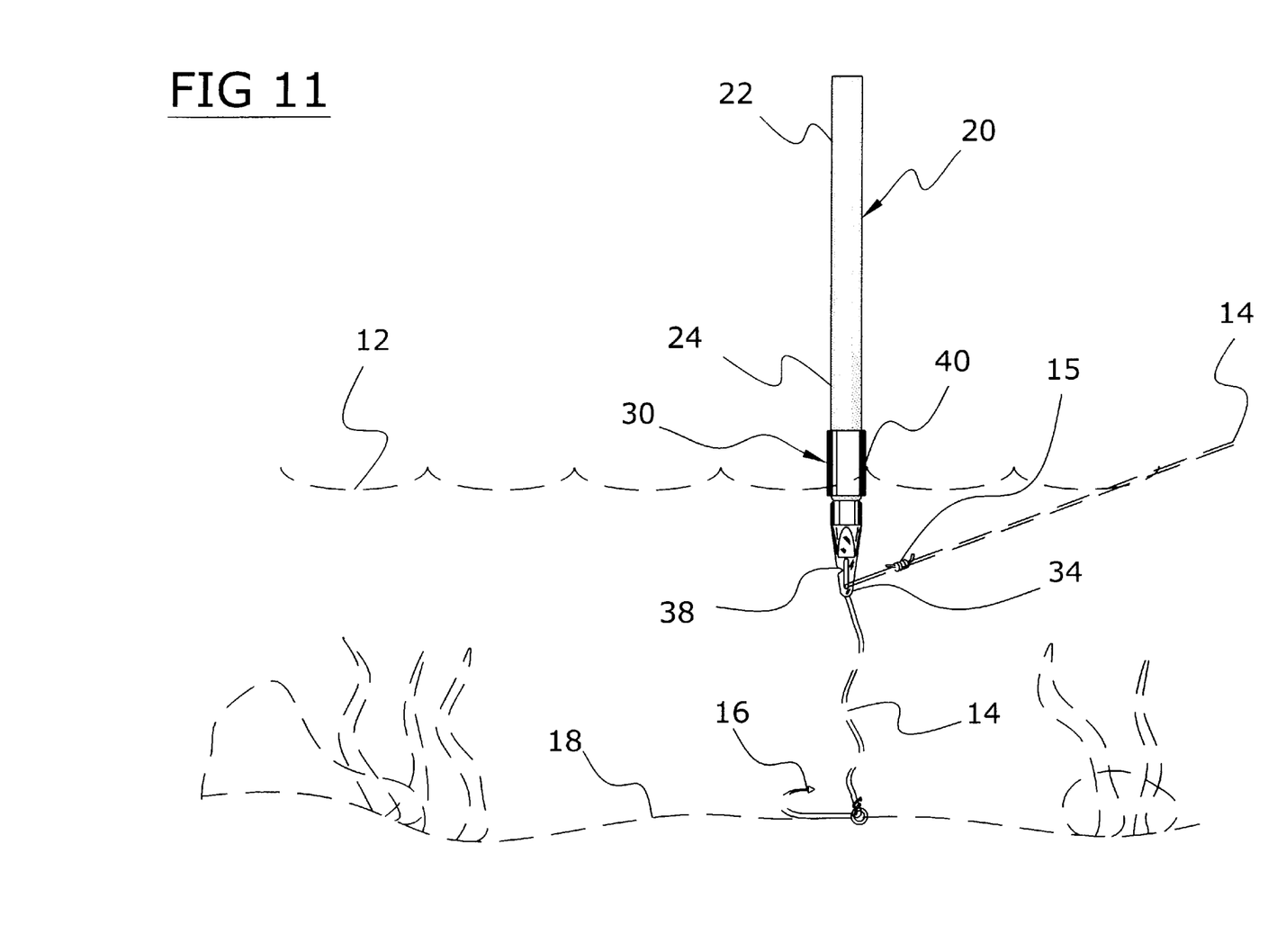
FIG. 11 is a side view of the adjustable weight positioned near the hook member in a vertical position with the fishing lure on the floor of the body of water.
Figure 12:
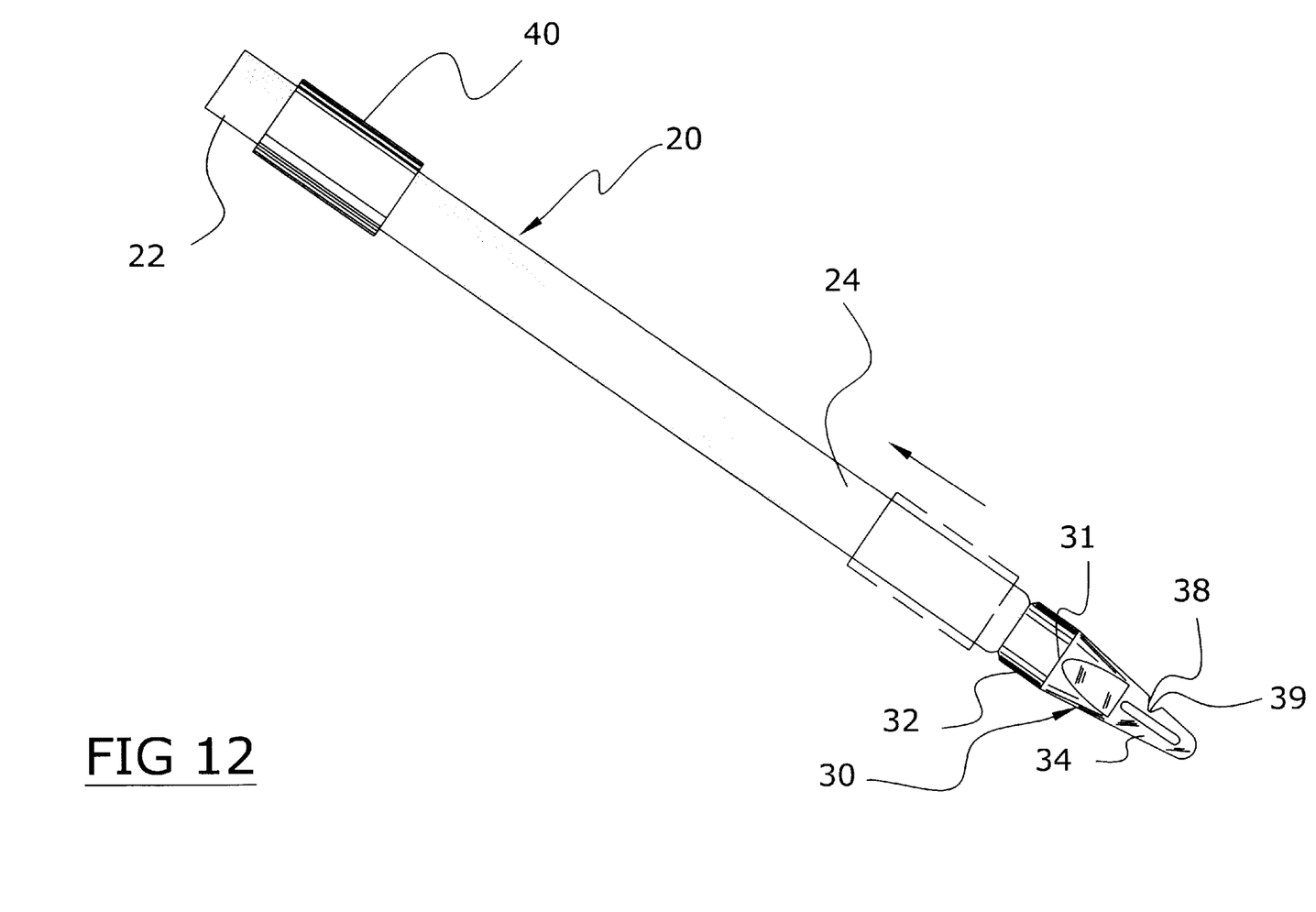
FIG. 12 is side view of the present invention illustrating the movement of the adjustable weight from near the hook member to the outer portion of the buoyant member.

FIG. 8 illustrates the first weight member 40 properly aligned upon the buoyant member 20 since the buoyant member 20 lies upon the water surface 12 in a horizontal manner when the jig 16 is upon the floor 18 of the body of water thereby indicating the jig 16 is undesirably upon the floor 18. FIG. 11 illustrates the first weight member 40 improperly aligned upon the buoyant member 20 since the buoyant member 20 extends from within the water surface 12 in a vertical manner when the jig 16 is upon the floor 18 thereby not providing an indication of the location of the jig 16 with respect to the floor 18. The problem with FIG. 11 is that the first weight member 40 is positioned too close to the hook member 30 and the second weight member 50 within, thereby providing little counterbalancing with respect to the second weight member 50. FIGS. 8 and 9 illustrate the first weight member 40 positioned a finite distance from the distal portion of the buoyant member 20. The user often times will have to adjust the position of the first weight member 40 until the desired balance is achieved such that the adjustable bobber system 10 enters into a vertical state when supporting the jig 16 above the floor 18, but also such that the adjustable bobber system 10 will lie horizontally when the jig 16 is positioned on the floor 18.

Alternatively, some pan fishermen desire to have the buoyant member 20 balanced such that the buoyant member 20 lies upon a horizontal axis while supporting the jig 16. When a fish strikes the jig 16, the buoyant member 20 pivots into a vertical axis thereby indicating to the pan fisherman that they have a bite.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of Elements for Adjustable Bobber System ENVIRONMENTAL ELEMENTS |
| --- |
| 10. Adjustable Bobber System |
| 11. |
| 12. Water Surface |
| 13. |
| 14. Fishing Line |
| 15. Stop Knot |
| 16. Jig |
| 17. |
| 18. Floor |
| 19. |
| 20. Buoyant Member |
| 21. |
| 22. Upper End |
| 23. |
| 24. Lower End |
| 25. |
| 26. Severed Portion |
| 27. |
| 28. |
| 29. |
| 30. Hook Member |
| 31. Open End |
| 32. Body |
| 33. Tapered Edge |
| 34. Jaw |
| 35. Cavity |
| 36. Slot |

| Index of Elements for Adjustable Bobber System ENVIRONMENTAL ELEMENTS |
| --- |
| 37. |
| 38. Slit |
| 39. Closed Portion |
| 40. First Weight Member |
| 41. |
| 42. |
| 43. |
| 44. |
| 45. |
| 46. |
| 47. |
| 48. |
| 49. |
| 50. Second Weight Member |
| 51. |
| 52. |
| 53. |
| 54. |
| 55. |
| 56. |
| 57. |
| 58. |
| 59. |
| 60. |
| 61. |
| 62. |
| 63. |
| 64. |
| 65. |
| 66. |
| 67. |
| 68. |
| 69. |
| 70. |
| 71. |
| 72. |
| 73. |
| 74. |
| 75. |
| 76. |
| 77. |
| 78. |
| 79. |

I claim:

1. An adjustable bobber system, comprising:
    a hook member having an open end exposing a cavity and an engaging end for releasably engaging a fishing line;
    an elongated buoyant member having a lower end and an upper end, wherein said lower end of said buoyant member is secured within said cavity of said hook member, and wherein said buoyant member is comprised of a material capable of being severed by a cutting device;
    a first weight member having a tubular structure positioned about said elongated buoyant member, wherein said first weight member may be repositioned along said elongated buoyant member; and
    a second weight member positioned within said hook member.

2. The adjustable bobber system of claim 1, wherein said buoyant member has an elongated structure.

3. The adjustable bobber system of claim 1, wherein said buoyant member is comprised of a material capable of being severed by a conventional cutting device.

4. The adjustable bobber system of claim 1, wherein said buoyant member is resilient and flexible for allowing easy removal of ice buildup therefrom.

5. The adjustable bobber system of claim 1, wherein said hook member further comprises:

a jaw extending from a body of said hook member;

a slot within said jaw; and a slit extending into a side of said jaw connecting to said slot.

6. The adjustable bobber system of claim 5, wherein said slot is wider than a diameter of said fishing line for allowing said fishing line to slide within said slot.

7. The adjustable bobber system of claim 5, wherein said slit has a broad portion and a narrow portion thereby tapering toward said slot.

8. The adjustable bobber system of claim 5, wherein said slit includes a closed portion thereby enclosing said slot, whereby said closed portion may be severed.

9. The adjustable bobber system of claim 5, wherein said open end of said body has a tapered edge.

10. The adjustable bobber system of claim 1, wherein said buoyant member is comprised of a foam rubber material.

* * * * *